(12) United States Patent
Zhu et al.

(10) Patent No.: US 10,289,451 B2
(45) Date of Patent: May 14, 2019

(54) METHOD, APPARATUS, AND SYSTEM FOR ADJUSTING DEPLOYMENT LOCATION OF VIRTUAL MACHINE

(71) Applicant: Huawei Technologies Co., Ltd., Shenzhen (CN)

(72) Inventors: Ren Zhu, Shenzhen (CN); Wei Zhou, Shenzhen (CN); Tizheng Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 139 days.

(21) Appl. No.: 15/673,070

(22) Filed: Aug. 9, 2017

(65) Prior Publication Data

US 2017/0337086 A1    Nov. 23, 2017

Related U.S. Application Data

(63) Continuation of application No. PCT/CN2015/082580, filed on Jun. 27, 2015.

(30) Foreign Application Priority Data

Feb. 9, 2015  (CN) .......................... 2015 1 0067057

(51) Int. Cl.
*G06F 12/00* (2006.01)
*G06F 9/50* (2006.01)
(Continued)

(52) U.S. Cl.
CPC ........ *G06F 9/5016* (2013.01); *G06F 9/45558* (2013.01); *G06F 9/5077* (2013.01);
(Continued)

(58) Field of Classification Search
CPC .. G06F 9/5016; G06F 9/45558; G06F 9/5077; G06F 2009/45583; G06F 12/00; H04L 29/08; H04L 67/10
See application file for complete search history.

(56) References Cited

U.S. PATENT DOCUMENTS

2011/0225277 A1   9/2011 Freimuth et al.
2012/0265868 A1  10/2012 Zhang et al.
(Continued)

FOREIGN PATENT DOCUMENTS

| CN | 103095599 A | 5/2013 |
| CN | 104298539 A | 1/2015 |
| CN | 104639639 A | 5/2015 |

OTHER PUBLICATIONS

Wu, Z., et al. "NetDEO: Automating Network Design, Evolution, and Optimization," XP032207376, IEEE 20th International Workshop on Quality of Service, Jun. 4-5, 2012, 9 pages.
(Continued)

*Primary Examiner* — Shawn X Gu

(74) *Attorney, Agent, or Firm* — Conley Rose, P.C.

(57) ABSTRACT

A method, an apparatus, and a system for adjusting a deployment location of a virtual machine in order resolve a problem that an inter-node communication cost has excessively great impact on an adjustment result in an existing solution for adjusting a deployment location of a virtual machine in a cloud computing system, the inter-node communication cost is corrected according to technical solutions provided in the embodiments of the present disclosure. Consequently, not only a corrected inter-node communication cost can exert impact on the result for adjusting a deployment location of a virtual machine, but also communication traffic can play a major role in affecting the adjustment result. Therefore, a more appropriate result for adjusting a deployment location of a virtual machine can be obtained, and bandwidth consumption inside the cloud computing system can be reduced.

20 Claims, 6 Drawing Sheets

(51) Int. Cl.
*H04L 29/08* (2006.01)
*G06F 9/455* (2018.01)

(52) U.S. Cl.
CPC .............. *H04L 29/08* (2013.01); *H04L 67/10* (2013.01); *G06F 2009/45583* (2013.01)

(56) References Cited

U.S. PATENT DOCUMENTS

2013/0304903 A1  11/2013  Mick et al.
2014/0143777 A1*  5/2014  Guo .......................... G06F 9/50
                                                      718/1

OTHER PUBLICATIONS

Chen, M., et al. "GreenGlue: Power Optimization for Data Centers Through Resource-guaranteed VM Placement," KP032747576, IEEE International Conference, Sep. 1-3, 2014, pp. 510-517.
Foreign Communication From A Counterpart Application, European Application No. 15881708.0, Extended European Search Report dated Dec. 15, 2017, 5 pages.
Machine Translation and Abstract of Chinese Publication No. CN103095599, May 8, 2013, 13 pages.
Machine Translation and Abstract of Chinese Publication No. CN104298539, Jan. 21, 2015, 13 pages.
Machine Translation and Abstract of Chinese Publication No. CN104639639, May 20, 2015, 31 pages.
Meng, X., et al., "Improving the Scalability of Data Center Networks with Traffic-Aware Virtual Machine Placement," Proceedings INFOCOM, Mar. 14-19, 2010, 9 pages.
Chen, T., et al., "LaSA: A Locality-aware Scheduling Algorithm for Hadoop-MapReduce Resource Assignment," International Conference on Collaboration Technologies and Systems (CTS), May 20-24, 2013, pp. 342-346.
Foreign Communication From A Counterpart Application, Chinese Application No. 201510067057.8, Chinese Office Action dated Aug. 25, 2017, 3 pages.
Foreign Communication From A Counterpart Application, Chinese Application No. 201510067057.8, Chinese Search Report dated Aug. 15, 2017, 2 pages.
Foreign Communication From A Counterpart Application, PCT Application No. PCT/CN2015/082580, English Translation of International Search Report dated Nov. 16, 2015, 2 pages.
Foreign Communication From A Counterpart Application, PCT Application No. PCT/CN2015/082580, English Translation of Written Opinion dated Nov. 16, 2015, 6 pages.

* cited by examiner $$\begin{bmatrix} - & 2.875 & 2.875 & 2.875 & 3.375 & 3.375 & 3.375 & 3.375 & 4.25 & 4.25 & 4.25 & 4.25 & 4.25 & 4.25 & 4.25 & 4.25 \\ 2.875 & - & 2.875 & 2.875 & 3.375 & 3.375 & 3.375 & 3.375 & 4.25 & 4.25 & 4.25 & 4.25 & 4.25 & 4.25 & 4.25 & 4.25 \\ 2.875 & 2.875 & - & 2.875 & 3.375 & 3.375 & 3.375 & 3.375 & 4.25 & 4.25 & 4.25 & 4.25 & 4.25 & 4.25 & 4.25 & 4.25 \\ 2.875 & 2.875 & 2.875 & - & 3.375 & 3.375 & 3.375 & 3.375 & 4.25 & 4.25 & 4.25 & 4.25 & 4.25 & 4.25 & 4.25 & 4.25 \\ 3.375 & 3.375 & 3.375 & 3.375 & - & 2.875 & 2.875 & 2.875 & 4.25 & 4.25 & 4.25 & 4.25 & 4.25 & 4.25 & 4.25 & 4.25 \\ \cdots \end{bmatrix}$$

METHOD, APPARATUS, AND SYSTEM FOR ADJUSTING DEPLOYMENT LOCATION OF VIRTUAL MACHINE

CROSS-REFERENCE TO RELATED APPLICATIONS

This application is a continuation of International Patent Application No. PCT/CN2015/082580 filed on Jun. 27, 2015, which claims priority to Chinese Patent Application No. 201510067057.8 filed on Feb. 9, 2015. The disclosures of the aforementioned applications are hereby incorporated by reference in their entireties.

TECHNICAL FIELD

The present disclosure relates to the field of cloud computing technologies, and in particular, to a method, an apparatus, and a system for adjusting a deployment location of a virtual machine.

BACKGROUND

Cloud computing technologies develop rapidly in recent years. With deployment of a large quantity of network-intensive applications in a cloud-platform data center network, network bandwidth inside a cloud computing system becomes a bottleneck resource in a cloud computing environment. How to reduce bandwidth consumption inside the cloud computing system is an important issue that needs to be considered during system deployment.

In a cloud computing system, a virtual machine is a basic unit for providing a cloud computing service. With running of the system, a large quantity of data is exchanged between different virtual machines, and occupies system network bandwidth resources. Therefore, scheduling and management of virtual machines directly determine bandwidth consumption inside the entire system, and further affect performance and a response speed of the entire system. To resolve the foregoing problem, a Traffic-aware Virtual Machine Placement Problem (TVMPP) optimization algorithm is proposed in other approaches. In this method, deployment locations of the virtual machines in the system are dynamically adjusted for a purpose of a minimum overall communication cost among the virtual machines such that intra-system data traffic generated among the virtual machines is controlled in a physical machine, or controlled in a same physical adjacency domain with a relatively small communication cost as far as possible. Consequently, intra-system network resources are used more efficiently, and the entire performance and response speed of the system are improved.

According to the TVMPP optimization algorithm, each virtual machine in the cloud computing system is considered as a network node. An adjacency degree between any two nodes is defined as a product of an inter-node communication cost and inter-node traffic. A deployment location of a virtual machine is adjusted according to an adjacency degree status of network nodes in the system. The adjustment is based on a minimum cut algorithm, and a basic idea is as follows. A higher communication cost and larger traffic between two nodes indicate a more urgent requirement for reducing the communication cost between the two nodes. However, it is discovered after a large quantity of tests that, the TVMPP optimization algorithm with an even appropriate general idea usually cannot lead to an expected adjustment effect in an actual application, and makes it difficult to effectively resolve a bandwidth consumption problem in the system.

SUMMARY

To resolve the foregoing technical problem, embodiments of the present disclosure provide a method, an apparatus, and a system for adjusting a deployment location of a virtual machine to implement appropriate deployment of a virtual machine in a cloud computing system, and reduce bandwidth consumption inside the system. Technical solutions are as follows.

According to a first aspect of the embodiments of the present disclosure, a method for adjusting a deployment location of a virtual machine is provided, and the method includes determining, according to a topology structure of a network in which a virtual machine is located, and a relationship between physical servers to which any two virtual machine nodes i and j in the network belong, a communication cost $C_{ij}$ (i≠j) between the nodes i and j, where $C_{ij}$ is a quantity of switches between i and j if i and j do not belong to a same physical server, $C_{ij}$ is a preset value if i and j belong to a same physical server, a value range of i includes all natural numbers that are not greater than N, a value range of j includes all natural numbers that are not greater than N, and N is a quantity of virtual machine nodes in the network, performing a data smoothing algorithm on $C_{ij}$ to obtain a corrected value $C_{ij}'$ of the communication cost between the two virtual machine nodes i and j, obtaining a traffic statistical value $D_{ij}$ between the two virtual machine nodes i and j that is in a preset historical period, calculating a corrected adjacency degree $A_{ij}'$ between the two virtual machine nodes i and j according to $C_{ij}'$ and $D_{ij}$, performing a minimum cut algorithm on a corrected adjacency degree graph including the virtual machine nodes in the network to obtain at least two sets, where each set includes at least one virtual machine node, different vertexes in the corrected adjacency degree graph are respectively corresponding to different virtual machine nodes, and an edge with a weight value $A_{ij}'$ exists between two vertexes corresponding to the two virtual machine nodes i and j, and adjusting a deployment location of a virtual machine node in the network according to the at least two sets such that for any virtual machine node x, if x and a virtual machine node y belong to a same set, and x and a virtual machine node z belong to different sets, a communication cost between x and y is not greater than a communication cost between x and z.

With reference to the first aspect of the embodiments of the present disclosure, in a first possible implementation manner, performing a minimum cut algorithm on a corrected adjacency degree graph including the virtual machine nodes in the network to obtain at least two sets includes performing a K-order minimum cut algorithm on the corrected adjacency degree graph including the N virtual machine nodes to obtain K sets, where K is a preset value, and K is a natural number not less than 2.

With reference to the first aspect of the embodiments of the present disclosure, in a second possible implementation manner, performing a minimum cut algorithm on a corrected adjacency degree graph including the virtual machine nodes in the network to obtain at least two sets includes performing clustering on the N virtual machine nodes according to a preset clustering rule to obtain at least one class cluster, where in a same class cluster, there is at least one other node P' for any node P such that a corrected adjacency degree between P' and P is not less than a preset threshold, and determining, according to a predefined physical adjacency domain division rule, a quantity M of virtual machine nodes that can be accommodated in each physical adjacency domain in the network, and iteratively performing a 2-order minimum cut algorithm on a corrected adjacency degree graph corresponding to each class cluster, to obtain a segmentation result corresponding to each class cluster, where each segmentation result includes at least one set, and a quantity of virtual machine nodes in each set is not greater than M.

With reference to the second possible implementation manner of the first aspect of the embodiments of the present disclosure, in a third possible implementation manner, the physical adjacency domain division rule includes that each physical server is classified as one physical adjacency domain.

With reference to the first aspect of the embodiments of the present disclosure, in a fourth possible implementation manner, performing a data smoothing algorithm on $C_{ij}$, to obtain a corrected value $C_{ij}'$ of the communication cost between the two virtual machine nodes i and j includes calculating the corrected value of the communication cost between the two virtual machine nodes i and j using $C_{ij}'=C_{ij}\times P_{ij}+C_E\times(1-P_{ij})$, where $P_{ij}$ is a statistical probability of $C_{ij}$ in all $C_{ij}$ values in the network, and $C_E$ is an arithmetic average value of all the $C_{ij}$ values.

With reference to the first aspect of the embodiments of the present disclosure, in a fifth possible implementation manner, performing a data smoothing algorithm on $C_{ij}$, to obtain a corrected value $C_{ij}'$ of the communication cost between the two virtual machine nodes i and j includes calculating the corrected value of the communication cost between the two virtual machine nodes i and j using $C_{ij}'=a\times C_{ij}+C_E$, where a is a preset correction coefficient, $a\in(0, 1)$, and $C_E$ is an arithmetic average value of all $C_{ij}$ values.

With reference to the first aspect of the embodiments of the present disclosure, in a sixth possible implementation manner, calculating a corrected adjacency degree $A_{ij}'$ between the two virtual machine nodes i and j according to $C_{ij}'$ and $D_{ij}$ includes calculating the corrected adjacency degree $A_{ij}'$ between the two virtual machine nodes i and j using $A_{ij}'=C_{ij}'\times D_{ij}$.

According to a second aspect of the embodiments of the present disclosure, an apparatus for adjusting a deployment location of a virtual machine is provided, and the apparatus includes a communication cost determining module configured to determine, according to a topology structure of a network in which a virtual machine is located, and a relationship between physical servers to which any two virtual machine nodes i and j in the network belong, a communication cost $C_{ij}$ ($i\neq j$) between the nodes i and j, where $C_{ij}$ is a quantity of switches between i and j if i and j do not belong to a same physical server, $C_{ij}$ is a preset value if i and j belong to a same physical server, a value range of i includes all natural numbers that are not greater than N, a value range of j includes all natural numbers that are not greater than N, and N is a quantity of virtual machine nodes in the network, a data smoothing module configured to perform a data smoothing algorithm on $C_{ij}$ obtained by the communication cost determining module to obtain a corrected value $C_{ij}'$ of the communication cost between the two virtual machine nodes i and j, a traffic statistical value obtaining module configured to obtain a traffic statistical value $D_{ij}$ between the two virtual machine nodes i and j that is in a preset historical period, a corrected adjacency degree calculation module configured to calculate a corrected adjacency degree $A_{ij}'$ between the two virtual machine nodes i and j according to $C_{ij}'$ obtained by the data smoothing module and $D_{ij}$ obtained by the traffic statistical value obtaining module, a minimum cut calculation module configured to perform a minimum cut algorithm on a corrected adjacency degree graph including the virtual machine nodes in the network to obtain at least two sets, where each set includes at least one virtual machine node, different vertexes in the corrected adjacency degree graph are respectively corresponding to different virtual machine nodes, and an edge with a weight value $A_{ij}'$ obtained by the corrected adjacency degree calculation module exists between two vertexes corresponding to the two virtual machine nodes i and j, and an adjustment module configured to adjust a deployment location of a virtual machine node in the network according to the at least two sets obtained by the minimum cut calculation module such that for any virtual machine node x, if x and a virtual machine node y belong to a same set, and x and a virtual machine node z belong to different sets, a communication cost between x and y is not greater than a communication cost between x and z.

With reference to the second aspect of the embodiments of the present disclosure, in a first possible implementation manner, the minimum cut calculation module is further configured to perform a K-order minimum cut algorithm on the corrected adjacency degree graph including the N virtual machine nodes to obtain K sets, where K is a preset value, and K is a natural number not less than 2.

With reference to the second aspect of the embodiments of the present disclosure, in a second possible implementation manner, the minimum cut calculation module includes a clustering submodule configured to perform clustering on the N virtual machine nodes according to a preset clustering rule to obtain at least one class cluster, where in a same class cluster, there is at least one other node P' for any node P such that a corrected adjacency degree between P' and P is not less than a preset threshold, and a segmentation submodule configured to determine, according to a predefined physical adjacency domain division rule, a quantity M of virtual machine nodes that can be accommodated in each physical adjacency domain in the network, and iteratively perform a 2-order minimum cut algorithm on a corrected adjacency degree graph corresponding to each class cluster obtained by the clustering submodule to obtain a segmentation result corresponding to each class cluster obtained by the clustering submodule, where each segmentation result includes at least one set, and a quantity of virtual machine nodes in each set is not greater than M.

With reference to the second aspect of the embodiments of the present disclosure, in a third possible implementation manner, the data smoothing module is further configured to calculate the corrected value of the communication cost between the two virtual machine nodes i and j using $C_{ij}'=C_{ij}\times P_{ij}+C_E\times(1-P_{ij})$, where $P_{ij}$ is a statistical probability of $C_{ij}$ in all $C_{ij}$ values in the network, and $C_E$ is an arithmetic average value of all the $C_{ij}$ values.

With reference to the second aspect of the embodiments of the present disclosure, in a fourth possible implementation manner, the data smoothing module is further configured to calculate the corrected value of the communication cost between the two virtual machine nodes i and j using $C_{ij}'=a\times C_{ij}+C_E$, where a is a preset correction coefficient, $a\in(0, 1)$, and $C_E$ is an arithmetic average value of all $C_{ij}$ values.

With reference to the second aspect of the embodiments of the present disclosure, in a fifth possible implementation manner, the corrected adjacency degree calculation module is further configured to calculate the corrected adjacency degree $A_{ij}'$ between the two virtual machine nodes i and j using $A_{ij}'=C_{ij}'\times D_{ij}$.

To resolve a problem that an inter-node communication cost has excessively great impact on an adjustment result in an existing solution for adjusting a deployment location of a virtual machine, an inter-node communication cost $C_{ij}$ is corrected according to the technical solutions provided in the embodiments of the present disclosure. Consequently, not only a corrected inter-node communication cost can exert impact on the result for adjusting a deployment location of a virtual machine, but also communication traffic can play a major role in affecting the adjustment result. Therefore, a more appropriate result for adjusting a deployment location of a virtual machine can be obtained, and bandwidth consumption inside a cloud computing system can be reduced.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To resolve a problem in an actual application of a TVMPP optimization algorithm, an embodiment of the present disclosure provides an improved method for adjusting a deployment location of a virtual machine in a cloud computing system. To describe technical solutions provided in this embodiment of the present disclosure more clearly, first, the TVMPP optimization algorithm is briefly described in the following.

According to the TVMPP optimization algorithm, an adjacency degree $A_{ij}$ between any two nodes is defined as follows:

$$A_{ij}=C_{ij}\times D_{ij}, \qquad (1)$$

where $C_{ij}$ is a communication cost between a node i and a node j, and $D_{ij}$ is data traffic between the node i and the node j.

A deployment location of each virtual machine in the system is considered as a virtual machine node. According to formula (1), an adjacency degree between any two virtual machine nodes in the system can be calculated. Then, a graph in which a virtual machine node is a vertex, and an adjacency degree between nodes is an edge weight value is generated according to a calculation result. A minimum cut algorithm is performed on the graph to obtain a recommended virtual machine deployment solution. A virtual machine is migrated according to this solution.

Figures 1, 2:
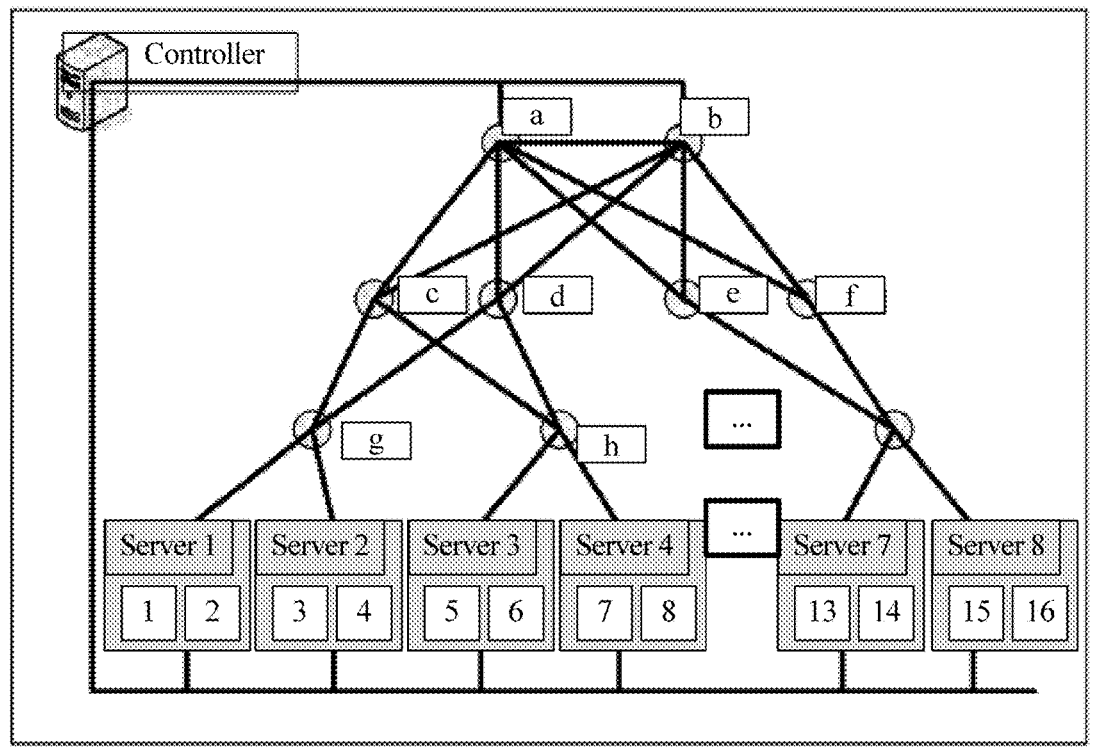
FIG. 1 is a schematic diagram of a virtual machine deployment solution before being adjusted in a cloud computing system.
FIG. 2 is a schematic diagram of an inter-node communication cost matrix of the system shown in FIG. 1.

The TVMPP optimization algorithm is described in the following with reference to an actual application scenario. FIG. 1 is a schematic structural diagram of a cloud computing system. There are eight servers in this system. Each server corresponds to one physical machine. Two virtual machines are deployed in each physical machine, and numbers of the virtual machines are from 1 to 16 in order. The physical machines communicate with each other using an intermediate network including switches, that is, switches a, b, c . . . in FIG. 1.

If an initial virtual machine deployment solution of the system is shown in FIG. 1, an inter-node communication cost matrix shown in FIG. 2 may be obtained by determining $C_{ij}$ according to a topology structure of a network.

If a controller as shown in FIG. 1, detects that, in a historical period, a traffic status of the initial deployment solution shown in FIG. 1 is as follows.

Traffic between a node 1 and a node 2: $D_{12}=2G$;
traffic between the node 1 and a node 3: $D_{13}=2G$;
traffic between the node 1 and a node 4: $D_{14}=2G$;
traffic between the node 1 and a node 5: $D_{15}=1G$; and
traffic between the node 1 and a node 13: $D_{1\_13}=1G$, According to formula (1), inter-node adjacency degrees in the system shown in FIG. 1 may be respectively calculated as follows.

An adjacency degree between the node 1 and the node 2: $A_{12}=2\times1=2$;
an adjacency degree between the node 1 and the node 3: $A_{13}=2\times1=2$;
an adjacency degree between the node 1 and the node 4: $A_{14}=2\times1=2$;
an adjacency degree between the node 1 and the node 5: $A_{15}=1\times3=3$; and
an adjacency degree between the node 1 and the node 13: $A_{1\_13}=1\times5=5$.

Figure 3:
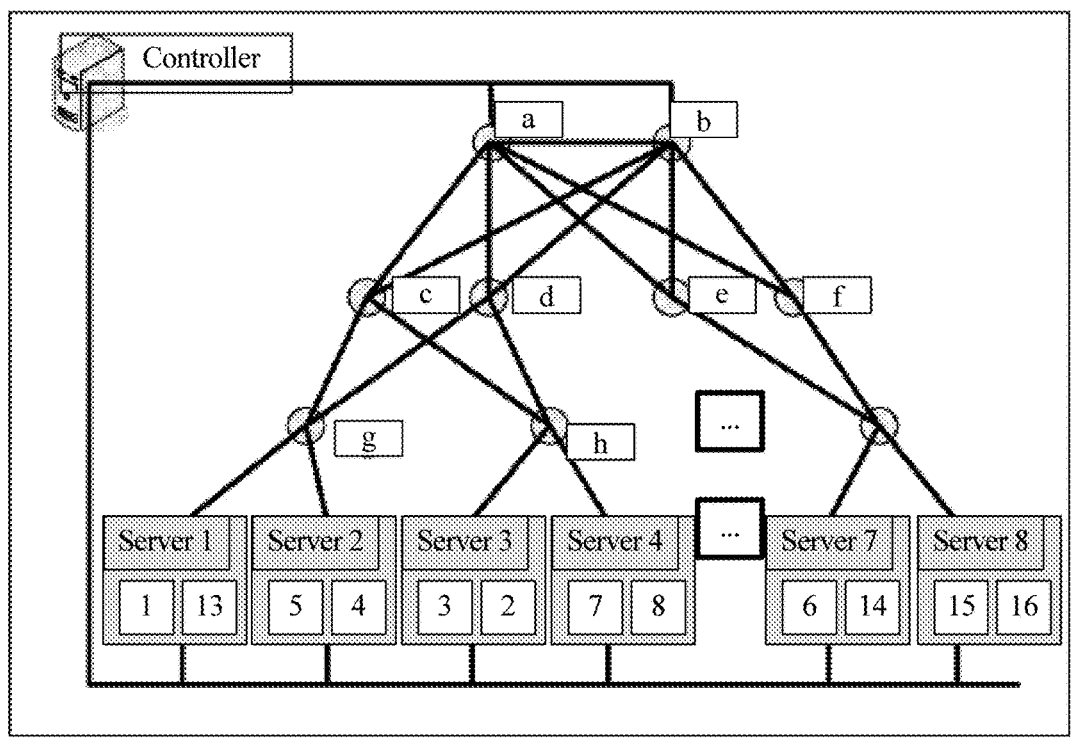
FIG. 3 is a schematic diagram of a result for adjusting the virtual machine deployment solution of the system shown in FIG. 1.

An adjacency degree graph is generated according to the calculated adjacency degrees. Then, an adjusted virtual machine deployment solution obtained using a minimum cut algorithm is shown in FIG. 3.

According to an idea of the TVMPP optimization algorithm, a communication cost between the two virtual machines 1 and 13 that have a maximum adjacency degree is adjusted to the minimum, and a communication cost between the virtual machines 1 and 5 is adjusted to the second minimum. However, according to the actual traffic status of the system, where $D_{1\_13}=D_{15}<D_{12}=D_{13}=D_{14}$, a communication cost between the virtual machines 1 and 2, the virtual machines 1 and 3, or the virtual machines 1 and 4 that have relatively large traffic should be preferably adjusted to the minimum. It can be learned that there is a relatively large difference between an adjustment result of the TVMPP optimization algorithm and an actually expected adjustment result.

A key reason of the foregoing problem of the TVMPP optimization algorithm is as follows. For a virtual machine location adjustment basis "inter-node adjacency degree," an "inter-node communication cost" used as a weight value should play a modification role only. However, the "inter-node communication cost" plays a major role in a calculation process of the TVMPP optimization algorithm, finally resulting in a great discrepancy between a result and an expectation.

To resolve the foregoing problem, in this embodiment of the present disclosure, a weight value used for calculating an inter-node adjacency degree is corrected in order to reduce impact of an "inter-node communication cost" on an adjustment result without ignoring the impact of the "inter-node communication cost", and make the adjustment result more appropriate. Specific technical solutions are as follows.

A communication cost $C_{ij}$ between any two virtual machine nodes i and j is first determined according to a topology structure of a network in which a virtual machine is located. Then, a data smoothing algorithm is performed on $C_{ij}$, to obtain a corrected value $C_{ij}'$ of the communication cost between the virtual machine nodes i and j.

In this embodiment of the present disclosure, an objective for using the data smoothing algorithm is to reduce a difference between a maximum value and a minimum value in $C_{ij}$, and narrow down a value range of $C_{ij}$. For example, the corrected value $C_{ij}'$ may be obtained by smoothing $C_{ij}$ using any one of the following formulas:

$$C_{ij}'=C_{ij}\times P_{ij}+C_E\times(1-P_{ij}), \quad (2.1)$$

where $P_{ij}$ is a statistical probability of $C_{ij}$ in all $C_{ij}$ values in the network, and $C_E$ is an arithmetic average value of all the $C_{ij}$ values;

$$C_{ij}'=C_{ij}\times P_{ij}+|C_{ij}-C_E|\times(1-P_{ij}), \quad (2.2)$$

where $P_{ij}$ is a statistical probability of $C_{ij}$ in all $C_{ij}$ values in the network, and $C_E$ is an arithmetic average value of all the $C_{ij}$ values; or $$C_{ij}'=a\times C_{ij}+C_E, \quad (2.3)$$

where a is a preset correction coefficient, $a\in(0, 1)$, and $C_E$ is an arithmetic average value of all $C_{ij}$ values.

A person skilled in the art may select a specific data smoothing algorithm according to an actual requirement. This does not need to be limited in this embodiment of the present disclosure.

Further, a corrected inter-node adjacency degree is calculated according to $C_{ij}'$ in the following:

$$A_{ij}'=C_{ij}'\times D_{ij}. \quad (3)$$

Finally, an inter-node adjacency degree graph in the network is generated using $A_{ij}'$, and an adjusted virtual machine deployment solution is obtained using a minimum cut algorithm.

In the foregoing solutions, because the data smoothing algorithm is used for processing $C_{ij}$, the "inter-node communication cost" used as a weight value exerts less impact on the virtual machine deployment adjustment result, and the adjustment result is more appropriate.

The method for adjusting a deployment location of a virtual machine according to this embodiment of the present disclosure is described in the following with reference to a specific application example.

A system shown in FIG. 1 is used as an example. There are eight servers in this system. Each server corresponds to one physical machine. Two virtual machines are deployed in each physical machine, and numbers of the virtual machines are from 1 to 16 in order. The physical machines communicate with each other using an intermediate network including switches, that is, switches a, b, c . . . in this figure. A controller is a management entity of an entire network, and has functions such as network traffic statistics collection, virtual machine deployment solution calculation, and virtual machine migration.

Figure 4:
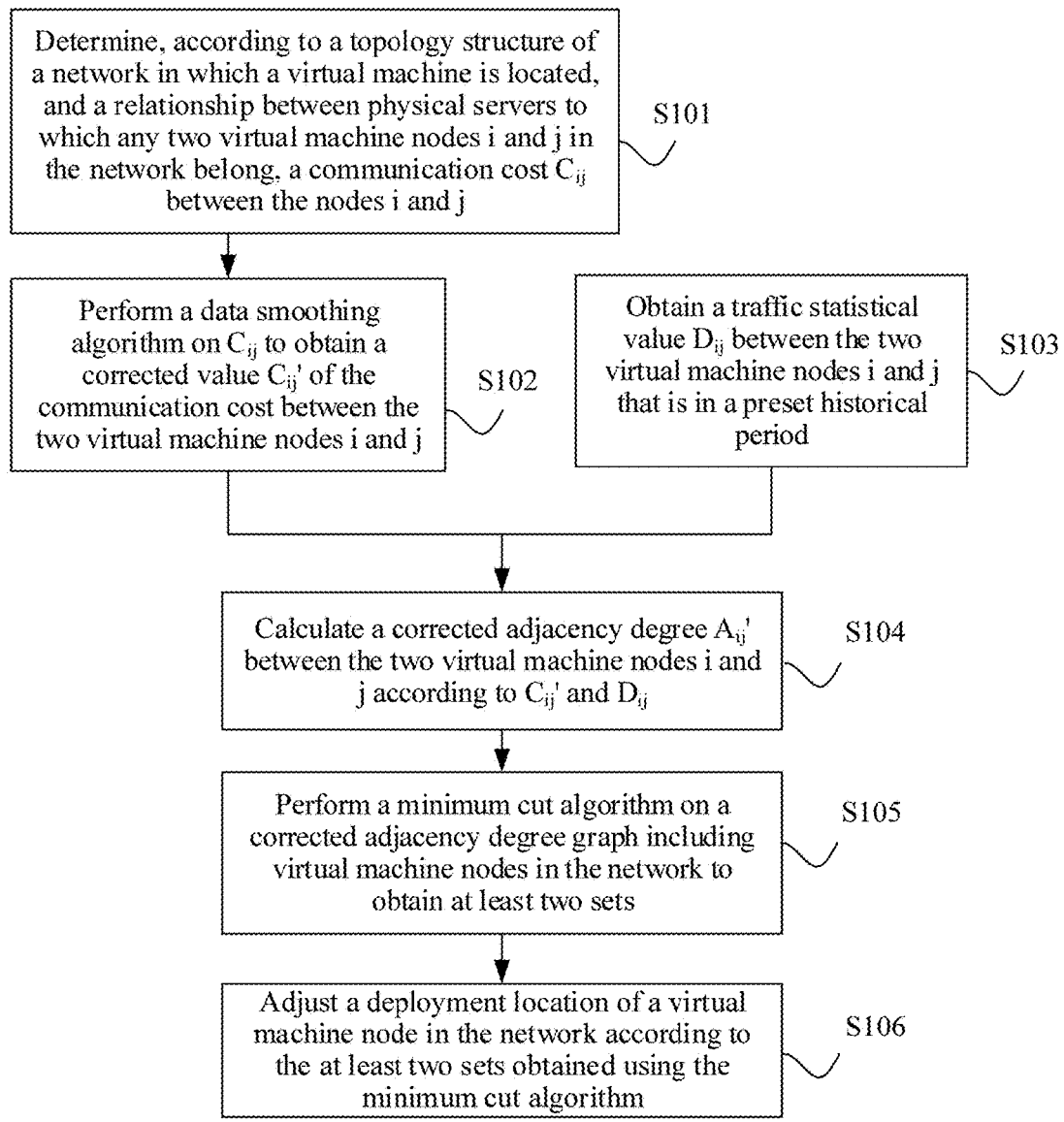
FIG. 4 is a flowchart of a method for adjusting a deployment location of a virtual machine according to an embodiment of the present disclosure.

FIG. 4 is a flowchart of a method for adjusting a deployment location of a virtual machine according to an embodiment of the present disclosure. This method may be executed by a controller in a cloud computing system, or may be executed by another management entity. The method may further include the following steps.

Step S101: Determine, according to a topology structure of a network in which a virtual machine is located, and a relationship between physical servers to which any two virtual machine nodes i and j in the network belong, a communication cost $C_{ij}$ between the nodes i and j.

$C_{ij}$ indicates the communication cost between the node i and the node j. A communication cost between two nodes may be generally understood as a communication distance between the two nodes, and the communication cost is determined using a network topology structure. That is, in a determinate network, a communication cost between any two given locations is unchanged.

For ease of calculation, a communication cost between two virtual machine nodes may be determined according to a quantity of switches between the nodes. In addition, virtual machines in a same physical server can communicate with each other without the need of a switch. Therefore, it may be specified using a same rule that a communication cost between two nodes in a same physical server is a preset value. That is, $C_{ij}$ is a quantity of switches between i and j if i and j do not belong to a same physical server, and $C_{ij}$ is a preset value if i and j belong to a same physical server. Generally, the preset value may be selected from an interval (0, 1].

If an initial virtual machine deployment solution of the system is shown in FIG. 1, and it is specified that a communication cost between two nodes in a same physical server is 1, a 16×16 communication cost matrix shown in FIG. 2 may be obtained according to the deployment solution in which a total quantity N of virtual machines is 16 as shown in FIG. 1.

According to the communication cost matrix shown in FIG. 2, it can be learned that $C_{ij}=C_{ji}$, that is, communication costs between two nodes in forward and reverse directions are the same. In addition, there is actually no communication cost if there is only one node, and therefore, when i=j, $C_{ij}$ has no actual meaning. In the matrix shown in FIG. 2, values on a principal diagonal are indicated using "-", and these values are not required in subsequent calculation.

Step S102: Perform a data smoothing algorithm on $C_{ij}$ to obtain a corrected value $C_{ij}'$ of the communication cost between the two virtual machine nodes i and j.

In this embodiment, $C_{ij}$ is smoothed using formula (2.1).

Statistics for probabilities that various communication cost values may occur are collected according to the network topology structure of the system. For example, according to the network topology structure of the system shown in FIG. 1, a statistical result is as follows.

A probability that a communication cost value 1 occurs in the network is 1/4;

a probability that a communication cost value 3 occurs in the network is 1/4; and a probability that a communication cost value 5 occurs in the network is 1/2.

An average value $C_E$ of communication costs between any two nodes in the entire network is calculated according to the statistical result.

$$C_E=1\times1/4+3\times1/4+5\times1/2=3.5$$

The communication cost between the nodes is corrected according to $C_{ij}'=C_{ij}\times P_{ij}+C_E\times(1-P_{ij})$, where $P_{ij}$ is a probability that $C_{ij}$ occurs in the network.

A corrected communication cost value corresponding to a node pair with the communication cost 1 is as follows:

$$1\times1/4+C_E\times(1-1/4)=2.875.$$

A corrected communication cost value corresponding to a node pair with the communication cost 3 is as follows:

$$3\times1/4+C_E\times(1-1/4)=3.375.$$

A corrected communication cost value corresponding to a node pair with the communication cost 5 is as follows:

$$5\times1/2+C_E\times(1-1/2)=4.25.$$

Figures 5, 6:
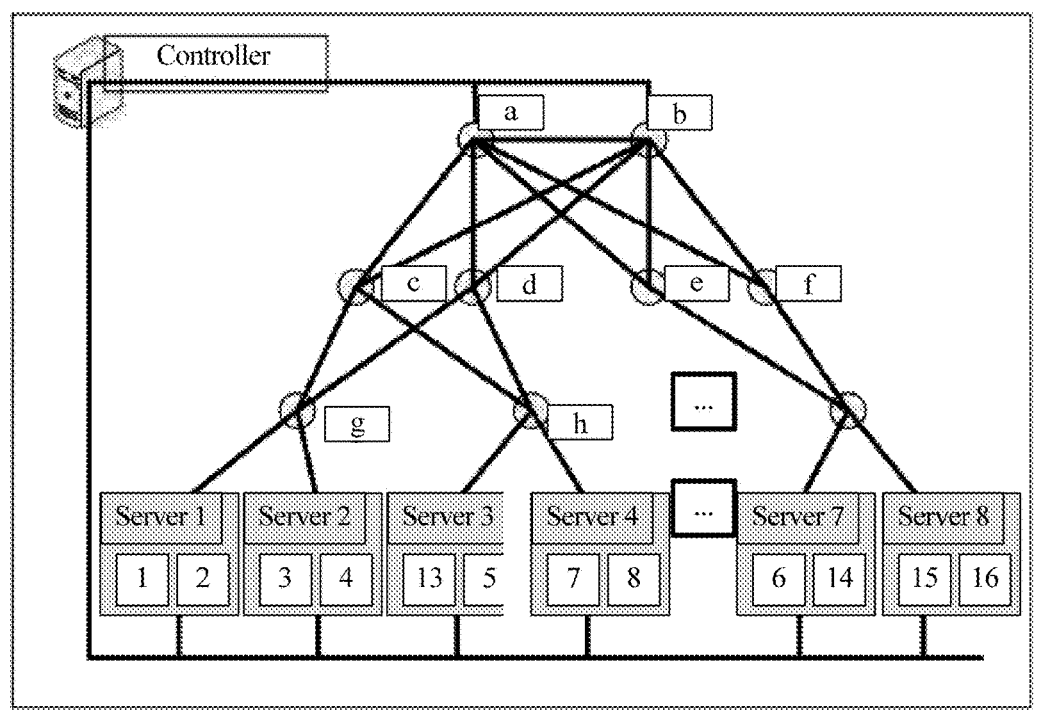
FIG. 5 is a schematic diagram of a corrected inter-node communication cost matrix of the system shown in FIG. 1.
FIG. 6 is a schematic diagram of a result for adjusting the virtual machine deployment solution of the system shown in FIG. 1 according to an embodiment of the present disclosure.

Then, a corrected communication cost matrix shown in FIG. 5 can be obtained.

Step S103: Obtain a traffic statistical value $D_{ij}$ between the two virtual machine nodes i and j that is in a preset historical period.

$D_{ij}$ is data traffic between the node i and the node j. The data is obtained by monitoring a network running status. In an actual application, statistics for inter-node traffic of the system in a historical period are usually collected, and a statistical result is used as an adjustment basis of a virtual machine deployment solution in a next period. An example of a typical application scenario is as follows. At 0 o'clock every day, statistics for an inter-node traffic status of the system on a previous day are collected, and then a virtual machine deployment solution on a current day is determined according to the traffic status on the previous day.

It is assumed that, in a historical period, a traffic status of the initial deployment solution shown in FIG. 1 is detected as follows.

Traffic between a node 1 and a node 2: $D_{12}=2G$;
traffic between the node 1 and a node 3: $D_{13}=2G$;
traffic between the node 1 and a node 4: $D_{14}=2G$;
traffic between the node 1 and a node 5: $D_{15}=1G$; and
traffic between the node 1 and a node 13: $D_{1\ 13}=1G$.

Step S104: Calculate a corrected adjacency degree $A_{ij}'$ between the two virtual machine nodes i and j according to $C_{ij}'$ and $D_{ij}$.

According to $C_{ij}'$ obtained in step S102 and $D_{ij}$ obtained in step S103, corrected inter-node adjacency degrees in the system shown in FIG. 1 may be respectively calculated using $A_{ij}'=C_{ij}'\times D_{ij}$ as follows.

A corrected adjacency degree between the node 1 and the node 2 $A_{12}'=2\times2.875=5.75$;

a corrected adjacency degree between the node 1 and the node 3: $A_{13}'=2\times2.875=5.75$;

a corrected adjacency degree between the node 1 and the node 4: $A_{14}'=2\times2.875=5.75$;

a corrected adjacency degree between the node 1 and the node 5: $A_{15}'=1\times3.375=3.375$; and a corrected adjacency degree between the node 1 and the node 13: $A_{1\ 13}'1\times4.25=4.25$.

Step S105: Perform a minimum cut algorithm on a corrected adjacency degree graph including the virtual machine nodes in the network to obtain at least two sets.

The corrected adjacency degree graph herein is generated according to the virtual machine nodes in the network. For any corrected adjacency degree graph, different vertexes in the graph are respectively corresponding to different virtual machine nodes, and an edge with a weight value $A_{ij}'$ exists between two vertexes corresponding to the two virtual machine nodes i and j.

In a specific implementation manner of the present disclosure, clustering may be performed on the N virtual machine nodes according to a preset clustering rule, to obtain at least one class cluster. In a same class cluster, there is at least one other node P' for any node P such that a corrected adjacency degree between P' and P is not less than a preset threshold. Then, a quantity M of virtual machine nodes that can be accommodated in each physical adjacency domain in the network is determined according to a predefined physical adjacency domain division rule. A 2-order minimum cut algorithm is iteratively performed on a corrected adjacency degree graph corresponding to each class cluster to obtain a segmentation result corresponding to each class cluster. Each segmentation result includes at least one set, and a quantity of virtual machine nodes in each set is not greater than M.

In the foregoing implementation manner, an objective for performing clustering on the virtual machine nodes is to classify virtual machine nodes that have a close interactive relationship into a same class cluster such that nodes in a same class cluster can be preferably allocated to locations that have a tight physical connection.

Accordingly, the "physical adjacency domain" may be flexibly defined according to an actual requirement. For example, each physical server may be defined as one physical adjacency domain, or multiple servers that have a relatively small communication cost may be defined as one physical adjacency domain. The physical adjacency domain division rule is stored in a form of preset information. The preset information can be read in a minimum cut calculation process, and then the parameter M that needs to be used in the minimum cut algorithm is determined.

According to a calculation result in step S104, if the preset corrected adjacency degree threshold is 3, because the five calculated corrected adjacency degrees are greater than the threshold, it is determined that the nodes 1, 2, 3, 4, 5, and 13 belong to a same class cluster. Then, a corrected adjacency degree graph is generated using the nodes 1, 2, 3, 4, 5, and 13 as vertexes, and using the corrected adjacency degrees as edge weight values.

In this embodiment, each physical server is defined as one physical adjacency domain, that is, two virtual machines can be accommodated in each physical adjacency domain.

The 2-order minimum cut algorithm is iteratively performed on the corrected adjacency degree graph, until a quantity of nodes in each subset is not greater than 2 in order to finally obtain a segmentation result that includes five virtual machine node subsets, 5, 13, 4, 3, and (1, 2). It can be learned that the quantity of nodes in each subset is less than the quantity 2 of virtual machines that can be accommodated in a physical server. In addition, the segmentation result is actually a subset sequence. Relative locations of all subsets in the sequence indicate an order for segmenting the subsets in a minimum cut iteration algorithm.

In first segmentation, the node 5 is segmented as a subset according to the minimum corrected adjacency degree A15'.

In second segmentation, the node 13 is segmented as a subset according to the second minimum corrected adjacency degree A1 13'.

By analogy, the finally obtained segmentation result is as follows: 5, 13, 4, 3, (1, 2).

It may be understood that an objective of the minimum cut algorithm is to determine, in all segments of the graph, a segment that has a minimum sum of edge weight values. Therefore, the division result may not be unique. For example, in the foregoing division result, the nodes 2, 3, and 4 may be mutually exchanged. In addition, for ease of description, this embodiment relates to traffic only between the node 1 and other nodes, and does not relate to traffic between other nodes (for example, between nodes 2 and 3). The minimum cut algorithm can be adapted to any scenario that may occur, and is not limited to processing the foregoing simple scenario.

In another specific implementation manner of the present disclosure, a K-order minimum cut algorithm may be performed on the corrected adjacency degree graph including the N virtual machine nodes to obtain K virtual machine node subsets. K is a preset value, and a value of K may be set according to an actual requirement, for example, according to a quantity of physical adjacency domains in the network, or according to a quantity of logical groups of system services, or the like.

An objective for setting the value of K in advance is to directly classify the virtual machine nodes into K groups according to an actual requirement. For example, for the system shown in FIG. 1, if the preset value K is 5, a 5-order minimum cut algorithm is directly performed on a corrected adjacency degree graph including nodes 1 to 16, to obtain five virtual machine node subsets.

Step S106: Adjust a deployment location of a virtual machine node in the network according to the at least two sets obtained using the minimum cut algorithm.

It may be understood that the minimum cut algorithm merely provides a recommendation for the virtual machine deployment solution from a mathematical perspective. However, the recommendation may not fully conform to an actual status of the system. Therefore, in an actual application, a minimum cut algorithm result may further need to be optimized with reference to the actual status of the system. A general optimization principle is as follows. In an adjusted virtual machine deployment solution, for any virtual machine node x, if x and a virtual machine node y belong to a same set, and x and a virtual machine node z belong to different sets, a communication cost between x and y is not greater than a communication cost between x and z. For a specific optimization policy, refer to an implementation manner in other approaches. Details are not described in this embodiment of the present disclosure.

For example, if the minimum cut algorithm is iteratively used, according to an iteration principle, the relative locations of all the subsets in the sequence indicate an order for iteratively segmenting the subsets, and a first-segmented node set should be deployed to a location with a relatively small communication cost.

A final virtual machine deployment solution is determined according to the segmentation result 5, 13, 4, 3, (1, 2) in step S105. A deployment location of a virtual machine is migrated by the controller. The adjusted virtual machine deployment solution is shown in FIG. 6. It can be learned that the virtual machines 1 and 2, the virtual machines 1 and 3, or the virtual machines 1 and 4 that have relatively large interactive data are adjusted to locations with relatively small communication costs. The virtual machines 1 and 13, and the virtual machines 1 and 5 that have relatively small interactive data are adjusted to locations with relatively large communication costs. This adjustment result conforms to an actually expected adjustment result.

It can be learned that, according to the solutions used in this embodiment of the present disclosure, an inter-node communication cost $C_{ij}$ is corrected. Consequently, not only a corrected inter-node communication cost can exert impact on a result for adjusting a deployment location of a virtual machine, but also communication traffic can play a major role in affecting the adjustment result. Therefore, a more appropriate result for adjusting a deployment location of a virtual machine can be obtained.

Figure 7:
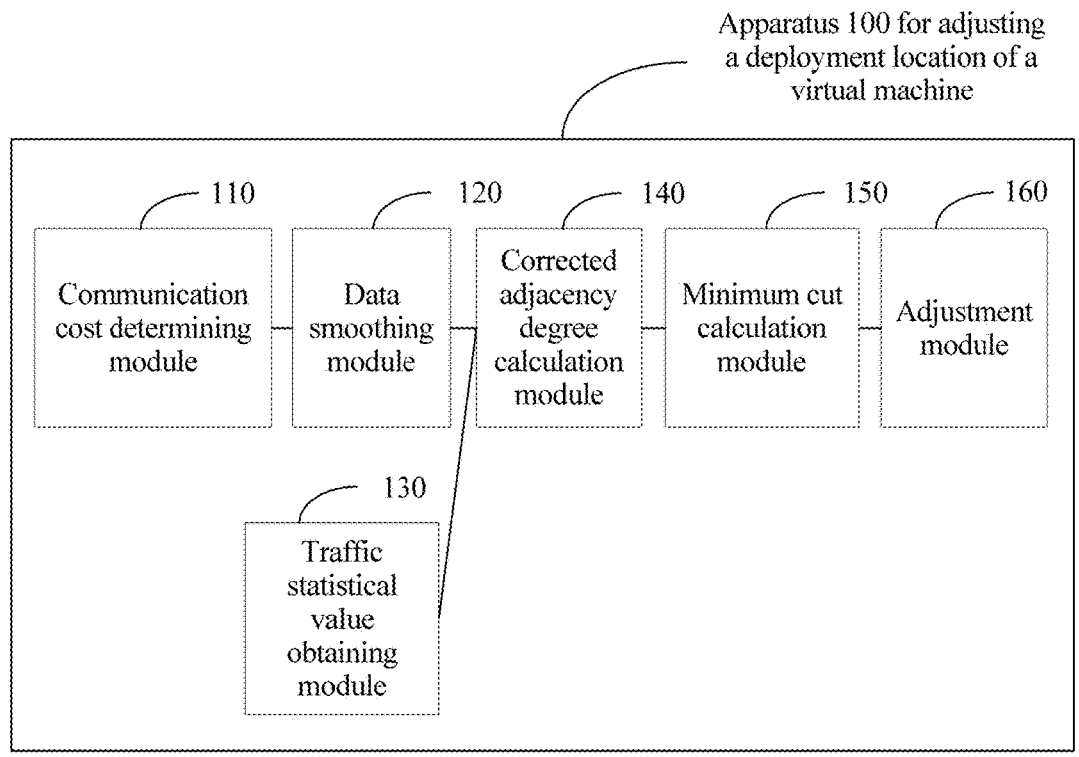
FIG. 7 is a schematic structural diagram of an apparatus for adjusting a deployment location of a virtual machine according to an embodiment of the present disclosure.

Corresponding to the foregoing method embodiment, an embodiment of the present disclosure further provides an apparatus 100 for adjusting a deployment location of a virtual machine. The apparatus 100 may be applied to a controller in a cloud computing system, or applied to another network management entity. Referring to FIG. 7, the apparatus 100 for adjusting a deployment location of a virtual machine may include a communication cost determining module 110, a data smoothing module 120, a traffic statistical value obtaining module 130, a corrected adjacency degree calculation module 140, a minimum cut calculation module 150, and an adjustment module 160. Operating principles and coordination relationships of all the modules are described in detail in the following.

The communication cost determining module 110 is configured to determine, according to a topology structure of a network in which a virtual machine is located, and a relationship between physical servers to which any two virtual machine nodes i and j in the network belong, a communication cost $C_{ij}$ ($i \neq j$) between the nodes i and j.

$C_{ij}$ indicates the communication cost between the node i and the node j. A communication cost between two nodes may be generally understood as a communication distance between the two nodes, and the communication cost is determined using a network topology structure. That is, in a determinate network, a communication cost between any two given locations is unchanged.

For ease of calculation, a communication cost between two virtual machine nodes may be determined according to a quantity of switches between the nodes. In addition, virtual machines in a same physical server can communicate with each other without the need of a switch. Therefore, it may be specified using a same rule that a communication cost between two nodes in a same physical server is a preset value. That is, $C_{ij}$ is a quantity of switches between i and j if i and j do not belong to a same physical server, and $C_{ij}$ is a preset value if i and j belong to a same physical server. Generally, the preset value may be selected from an interval (0, 1].

If an initial virtual machine deployment solution of the system is shown in FIG. 1, and it is specified that a communication cost between two nodes in a same physical server is 1, a 16×16 communication cost matrix shown in FIG. 2 may be obtained according to the deployment solution in which a total quantity N of virtual machines is 16 as shown in FIG. 1.

According to the communication cost matrix shown in FIG. 2, it can be learned that $C_{ij}=C_{ji}$, that is, communication costs between two nodes in forward and reverse directions are the same. In addition, there is actually no communication cost if there is only one node, and therefore, when i=j, $C_{ij}$ has no actual meaning. In the matrix shown in FIG. 2, values on a principal diagonal are indicated using "-", and these values are not required in subsequent calculation.

The data smoothing module 120 is configured to perform a data smoothing algorithm on $C_{ij}$ obtained by the communication cost determining module 110 to obtain a corrected value Cij' of the communication cost between the two virtual machine nodes i and j.

In this embodiment of the present disclosure, an objective for using the data smoothing algorithm is to reduce a difference between a maximum value and a minimum value in Cij, and narrow down a value range of Cij. A person skilled in the art may select, according to an actual requirement, a specific data smoothing algorithm used by the data smoothing module 120, such as the smoothing algorithms shown in formulas (2.1), (2.2), and (2.3). This does not need to be limited in this embodiment of the present disclosure.

In this embodiment, Cij is smoothed by the data smoothing module 120 using formula (2.1).

Statistics for probabilities that various communication cost values may occur are collected according to the network topology structure of the system. For example, according to the network topology structure of the system shown in FIG. 1, a statistical result is as follows.

A probability that a communication cost value 1 occurs in the network is 1/4;

a probability that a communication cost value 3 occurs in the network is 1/4; and a probability that a communication cost value 5 occurs in the network is 1/2.

An average value CE of communication costs between any two nodes in the entire network is calculated according to the statistical result.

$$CE=1\times1/4+3\times1/4+5\times1/2=3.5.$$

The communication cost between the nodes is corrected according to Cij'=Cij×Pij+CE×(1−Pij), where Pij is a probability that Cij occurs in the network.

A corrected communication cost value corresponding to a node pair with the communication cost 1 is as follows:

$$1\times1/4+C_E\times(1-1/4)=2.875.$$

A corrected communication cost value corresponding to a node pair with the communication cost 3 is as follows:

$$3\times1/4+C_E\times(1-1/4)=3.375.$$

A corrected communication cost value corresponding to a node pair with the communication cost 5 is as follows:

$$5\times1/2+C_E\times(1-1/2)=4.25.$$

Then, a corrected communication cost matrix shown in FIG. 5 can be obtained.

The traffic statistical value obtaining module 130 is configured to obtain a traffic statistical value $D_{ij}$ between the two virtual machine nodes i and j that is in a preset historical period.

$D_{ij}$ is data traffic between the node i and the node j. The data is obtained by monitoring a network running status. In an actual application, statistics for inter-node traffic of the system in a historical period are usually collected, and a statistical result is used as an adjustment basis of a virtual machine deployment solution in a next period. An example of a typical application scenario is as follows. At 0 o'clock every day, statistics for an inter-node traffic status of the system on a previous day are collected, and then a virtual machine deployment solution on a current day is determined according to the traffic status on the previous day.

It is assumed that, in a historical period, a traffic status of the initial deployment solution shown in FIG. 1 is detected as follows.

Traffic between a node 1 and a node 2: D12=2G;

traffic between the node 1 and a node 3: D13=2G;

traffic between the node 1 and a node 4: D14=2G;

traffic between the node 1 and a node 5: D15=1G; and traffic between the node 1 and a node 13: D1 13=1G.

The corrected adjacency degree calculation module 140 is configured to calculate a corrected adjacency degree $A_{ij}'$ between the two virtual machine nodes i and j according to $C_{ij}'$ obtained by the data smoothing module 120 and $D_{ij}$ obtained by the traffic statistical value obtaining module 130.

According to $C_{ij}'$ obtained by the data smoothing module 120 and $D_{ij}$ obtained by the traffic statistical value obtaining module 130, corrected inter-node adjacency degrees in the system shown in FIG. 1 may be respectively calculated using $A_{ij}'=C_{ij}'\times D_{ij}$ as follows.

A corrected adjacency degree between the node 1 and the node 2: $A_{12}'=2\times2.875=5.75$;

a corrected adjacency degree between the node 1 and the node 3: $A_{13}'=2\times2.875=5.75$;

a corrected adjacency degree between the node 1 and the node 4: $A_{14}'=2\times2.875=5.75$;

a corrected adjacency degree between the node 1 and the node 5: $A_{15}'=1\times3.375=3.375$; and a corrected adjacency degree between the node 1 and the node 13: $A_{1\,13}'1\times4.25=4.25$.

The minimum cut calculation module 150 is configured to perform a minimum cut algorithm on a corrected adjacency degree graph including the virtual machine nodes in the network to obtain at least two sets.

The corrected adjacency degree graph herein is generated according to the virtual machine nodes in the network. For any corrected adjacency degree graph, different vertexes in the graph are respectively corresponding to different virtual machine nodes, and an edge with a weight value $A_{ij}'$ exists between two vertexes corresponding to the two virtual machine nodes i and j.

Figure 8:
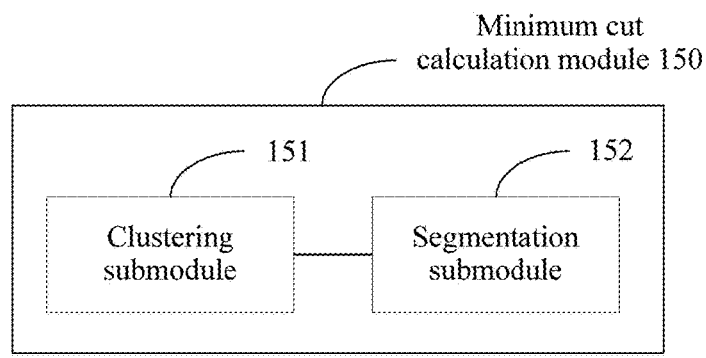
FIG. 8 is a schematic structural diagram of a minimum cut calculation module in an apparatus for adjusting a deployment location of a virtual machine according to an embodiment of the present disclosure.

Referring to FIG. 8, in a specific implementation manner of the present disclosure, the minimum cut calculation module 150 may include a clustering submodule 151 configured to perform clustering on the N virtual machine nodes according to a preset clustering rule to obtain at least one class cluster, where in a same class cluster, there is at least one other node P' for any node P such that a corrected adjacency degree between P' and P is not less than a preset threshold, and a segmentation submodule 152 configured to determine, according to a predefined physical adjacency domain division rule, a quantity M of virtual machine nodes that can be accommodated in each physical adjacency domain in the network, and iteratively perform a 2-order minimum cut algorithm on a corrected adjacency degree graph corresponding to each class cluster obtained by the clustering submodule 151 to obtain a segmentation result corresponding to each class cluster obtained by the clustering submodule 151, where each segmentation result includes at least one set.

In the foregoing implementation manner, an objective for performing clustering on the virtual machine nodes is to classify virtual machine nodes that have a close interactive relationship into a same class cluster such that nodes in a same class cluster can be preferably allocated to locations that have a tight physical connection.

Accordingly, the "physical adjacency domain" may be flexibly defined according to an actual requirement. For example, each physical server may be defined as one physical adjacency domain, or multiple servers that have a relatively small communication cost may be defined as one physical adjacency domain. The physical adjacency domain division rule is stored in a form of preset information. The preset information can be read in a minimum cut calculation process, and then the parameter M that needs to be used in the minimum cut algorithm is determined.

According to a calculation result obtained by the corrected adjacency degree calculation module 140, if the preset corrected adjacency degree threshold is 3, because the five calculated corrected adjacency degrees are greater than the threshold, it is determined that the nodes 1, 2, 3, 4, 5, and 13 belong to a same class cluster. Then, a corrected adjacency degree graph is generated using the nodes 1, 2, 3, 4, 5, and 13 as vertexes, and using the corrected adjacency degrees as edge weight values.

In this embodiment, each physical server is defined as one physical adjacency domain, that is, two virtual machines can be accommodated in each physical adjacency domain.

The 2-order minimum cut algorithm is iteratively performed on the corrected adjacency degree graph, until a quantity of nodes in each subset is not greater than 2 in order to finally obtain a segmentation result that includes five virtual machine node subsets 5, 13, 4, 3, and (1, 2). It can be learned that the quantity of nodes in each subset is less than the quantity 2 of virtual machines that can be accommodated in a physical server. In addition, the segmentation result is actually a subset sequence. Relative locations of all subsets in the sequence indicate an order for segmenting the subsets in a minimum cut iteration algorithm.

In first segmentation, the node 5 is segmented as a subset according to the minimum corrected adjacency degree $A_{15}'$.

In second segmentation, the node 13 is segmented as a subset according to the second minimum corrected adjacency degree $A_{1\ 13}'$.

By analogy, the finally obtained segmentation result is as follows: 5, 13, 4, 3, (1, 2).

It may be understood that an objective of the minimum cut algorithm is to determine, in all segments of the graph, a segment that has a minimum sum of edge weight values. Therefore, the division result may not be unique. For example, in the foregoing division result, the nodes 2, 3, and 4 may be mutually exchanged. In addition, for ease of description, this embodiment relates to traffic only between the node 1 and other nodes, and does not relate to traffic between other nodes (for example, between nodes 2 and 3). The minimum cut algorithm can be adapted to any scenario that may occur, and is not limited to processing the foregoing simple scenario.

In another specific implementation manner of the present disclosure, the minimum cut calculation module 150 may perform a K-order minimum cut algorithm on the corrected adjacency degree graph including the N virtual machine nodes to obtain K virtual machine node subsets. K is a preset value, and a value of K may be set according to an actual requirement, for example, according to a quantity of physical adjacency domains in the network, or according to a quantity of logical groups of system services, or the like.

An objective for setting the value of K in advance is to directly classify the virtual machine nodes into K groups according to an actual requirement. For example, for the system shown in FIG. 1, if the preset value K is 5, a 5-order minimum cut algorithm is directly performed on a corrected adjacency degree graph including nodes 1 to 16, to obtain five virtual machine node subsets.

The adjustment module 160 is configured to adjust a deployment location of a virtual machine node in the network according to the at least two sets obtained by the minimum cut calculation module 150.

It may be understood that the minimum cut algorithm merely provides a recommendation for the virtual machine deployment solution from a mathematical perspective. However, the recommendation may not fully conform to an actual status of the system. Therefore, in an actual application, a minimum cut algorithm result may further need to be optimized with reference to the actual status of the system. A general optimization principle is as follows. In an adjusted virtual machine deployment solution, for any virtual machine node x, if x and a virtual machine node y belong to a same set, and x and a virtual machine node z belong to different sets, a communication cost between x and y is not greater than a communication cost between x and z. For a specific optimization policy, refer to an implementation manner in other approaches. Details are not described in this embodiment of the present disclosure.

For example, if the minimum cut algorithm is iteratively used, according to an iteration principle, the relative locations of all the subsets in the sequence indicate an order for iteratively segmenting the subsets, and a first-segmented node set should be deployed to a location with a relatively small communication cost.

The adjustment module 160 determines a final virtual machine deployment solution according to the segmentation result 5, 13, 4, 3, (1, 2) obtained by the minimum cut calculation module 150. A deployment location of a virtual machine is migrated by the controller. The adjusted virtual machine deployment solution is shown in FIG. 6. It can be learned that the virtual machines 1 and 2, the virtual machines 1 and 3, or the virtual machines 1 and 4 that have relatively large interactive data are adjusted to locations with relatively small communication costs. The virtual machines 1 and 13, and the virtual machines 1 and 5 that have relatively small interactive data are adjusted to locations with relatively large communication costs. This adjustment result conforms to an actually expected adjustment result.

It can be learned that, according to the solutions used in this embodiment of the present disclosure, an inter-node communication cost $C_{ij}$ is corrected. Consequently, not only a corrected inter-node communication cost can exert impact on a result for adjusting a deployment location of a virtual machine, but also communication traffic can play a major role in affecting the adjustment result. Therefore, a more appropriate result for adjusting a deployment location of a virtual machine can be obtained.

Figure 9:
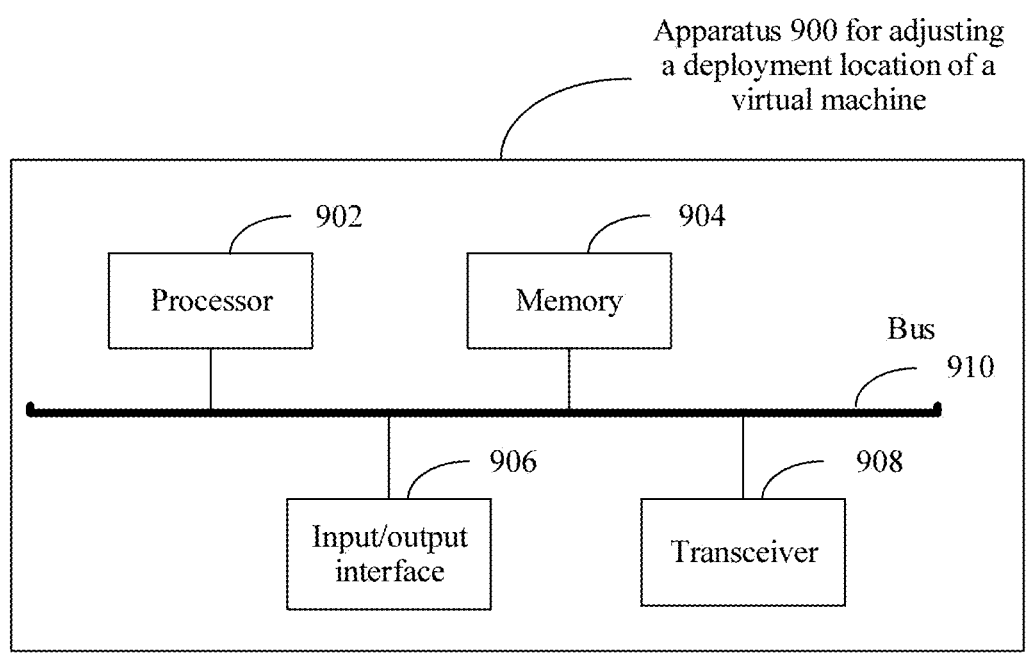
FIG. 9 is a schematic diagram of a hardware structure of an apparatus for adjusting a deployment location of a virtual machine according to an embodiment of the present disclosure.

FIG. 9 is a schematic diagram of a hardware structure of an apparatus 900 for adjusting a deployment location of a virtual machine according to an embodiment of the present disclosure. As shown in FIG. 9, the apparatus 900 for adjusting a deployment location of a virtual machine includes a processor 902, a memory 904, an input/output interface 906, a transceiver 908, and a bus 910. The processor 902, the memory 904, the input/output interface 906, and the transceiver 908 communicatively connect to each other using the bus 910.

The processor 902 may use a general-purpose central processing unit (CPU), a microprocessor, an application-specific integrated circuit (ASIC), or one or more integrated circuits. The processor 902 is configured to execute a related program to implement technical solutions provided in this embodiment of the present disclosure.

The memory 904 may be a read-only memory (ROM), a static storage device, a dynamic storage device, or a random access memory (RAM). The memory 904 may store an operating system and another application program. When the technical solutions provided in this embodiment of the present disclosure are implemented using software or firmware, program code used to implement the technical solutions provided in this embodiment of the present disclosure is stored in the memory 904, and is executed by the processor 902.

The input/output interface 906 is configured to receive input data and information, and output data such as an operation result.

The transceiver 908 uses a transceiver apparatus, by way of example but not limitation, a transceiver to implement communication between another device or communications network and the apparatus 900 for adjusting a deployment location of a virtual machine.

The bus 910 may include a channel, and transfers information between all components (such as the processor 902, the memory 904, the input/output interface 906, and the transceiver 908) of the apparatus 900 for adjusting a deployment location of a virtual machine.

It should be noted that the apparatus 900 for adjusting a deployment location of a virtual machine in FIG. 9 shows only the processor 902, the memory 904, the input/output interface 906, the transceiver 908, and the bus 910. However, in a specific implementation process, a person skilled in the art should understand that the apparatus 900 for adjusting a deployment location of a virtual machine further includes another necessary component used for normal operation. In addition, a person skilled in the art should understand that, according to a specific requirement, the apparatus 900 for adjusting a deployment location of a virtual machine may further include a hardware component used for implementing another additional function. Furthermore, a person skilled in the art should understand that the apparatus 900 for adjusting a deployment location of a virtual machine may include only a necessary component used for implementing this embodiment of the present disclosure, and does not need to include all the components shown in FIG. 9.

The hardware structure shown in FIG. 9 and the foregoing description are applicable to various apparatuses for adjusting a deployment location of a virtual machine according to this embodiment of the present disclosure.

The transceiver 908 can obtain, by invoking a program or instruction stored in the memory 904, a topology structure of a network in which a virtual machine is located.

The processor 902 can determine a communication cost $C_{ij}$ ($i \neq j$) between any two virtual machine nodes i and j in the network according to the topology structure of the network in which the virtual machine is located, and can perform a data smoothing algorithm on $C_{ij}$ to obtain a corrected value $C_{ij}'$ of the communication cost between the two virtual machine nodes i and j.

The transceiver 908 further obtains a traffic statistical value $D_{ij}$ between the two virtual machine nodes i and j that is in a preset historical period.

Further, the processor 902 calculates a corrected adjacency degree $A_{ij}'$ between the two virtual machine nodes i and j according to $C_{ij}'$ and $D_{ij}$, performs a minimum cut algorithm on a corrected adjacency degree graph including the virtual machine nodes in the network to obtain at least two sets, and then adjusts a deployment location of a virtual machine node in the network according to these sets such that for any virtual machine node x, if x and a virtual machine node y belong to a same set, and x and a virtual machine node z belong to different sets, a communication cost between x and y is not greater than a communication cost between x and z.

It may be learned from description of the foregoing implementation manners that, a person skilled in the art may clearly understand that the present disclosure may be implemented using software in addition to a necessary universal hardware platform. Based on such an understanding, the technical solutions of the present disclosure essentially or the part contributing to the other approaches may be implemented in a form of a software product. The software product may be stored in a storage medium, such as a ROM/RAM, a magnetic disk, or an optical disc, and includes several instructions for instructing a computer device (which may be a personal computer, a server, or a network device) to perform the methods described in the embodiments or some parts of the embodiments of the present disclosure.

The embodiments in this specification are all described in a progressive manner, for same or similar parts in the embodiments, reference may be made to these embodiments, and each embodiment focuses on a difference from other embodiments. Especially, an apparatus embodiment is basically similar to a method embodiment, and therefore is described briefly, for related parts, reference may be made to partial descriptions in the method embodiment. The described apparatus embodiment is merely an example. The units described as separate parts may or may not be physically separate, and parts displayed as units may or may not be physical units, may be located in one location, or may be distributed on a plurality of network units. Some or all the modules may be selected according to actual needs to achieve the objectives of the solutions of the embodiments. A person of ordinary skill in the art may understand and implement the embodiments of the present disclosure without creative efforts.

The foregoing descriptions are merely specific implementation manners of the present disclosure. It should be noted that a person of ordinary skill in the art may make several improvements or polishing without departing from the principle of this application and the improvements or polishing shall fall within the protection scope of this application.

What is claimed is:

1. A method for adjusting a deployment location of a virtual machine, comprising:

determining, according to a topology structure of a network in which the virtual machine is located, and a relationship between physical servers to which any two virtual machine nodes i and j in the network belong, a communication cost between the two virtual machine nodes i and j ($C_{ij}$), wherein the $C_{ij}$ is a quantity of switches between the two virtual machine nodes i and j when the two virtual machine nodes i and j do not belong to a same physical server, wherein the $C_{ij}$ is a preset value when the two virtual machine nodes i and j belong to the same physical server, wherein $i \neq j$, wherein a value range of the i comprises all natural numbers not greater than N, wherein a value range of the j comprises all natural numbers not greater than N, and wherein N is a quantity of virtual machine nodes in the network;

performing a data smoothing algorithm on the $C_{ij}$ to obtain a corrected value of the $C_{ij}$ ($C_{ij}'$);

obtaining a traffic statistical value between the two virtual machine nodes i and j ($D_{ij}$) in a preset historical period;

calculating a corrected adjacency degree between the two virtual machine nodes i and j ($A_{ij}'$) according to the $C_{ij}'$ and the $D_{ij}$;

performing a minimum cut algorithm on a corrected adjacency degree graph comprising the N virtual machine nodes in the network to obtain at least two sets, wherein each set comprises at least one virtual machine node, wherein different vertexes in the corrected adjacency degree graph are respectively corresponding to different virtual machine nodes, and wherein an edge with a weight value $A_{ij}'$ exists between two vertexes corresponding to the two virtual machine nodes i and j; and adjusting deployment location of a virtual machine node in the network according to the at least two sets such that for any virtual machine node (x), when the x and a virtual machine node (y) belong to a same set, and the x and a virtual machine node (z) belong to different sets, a communication cost between the x and the y is not greater than a communication cost between the x and the z.

2. The method according to claim 1, wherein performing the minimum cut algorithm on the corrected adjacency degree graph comprises performing a K-order minimum cut algorithm on the corrected adjacency degree graph comprising the N virtual machine nodes to obtain K sets, wherein K is a preset value, and wherein K is a natural number not less than 2.

3. The method according to claim 1, wherein performing the minimum cut algorithm on the corrected adjacency degree graph comprises:
performing clustering on the N virtual machine nodes according to a preset clustering rule to obtain at least one class cluster, wherein in a same class cluster, there is at least one other node P' for any node P such that a corrected adjacency degree between P' and P is not less than a preset threshold;
determining, according to a predefined physical adjacency domain division rule, a quantity of virtual machine nodes that can be accommodated in each physical adjacency domain (M) in the network; and
iteratively performing a 2-order minimum cut algorithm on a corrected adjacency degree graph corresponding to each class cluster to obtain a segmentation result corresponding to each class cluster, wherein each segmentation result comprises at least one set, and wherein a quantity of virtual machine nodes in each set is not greater than M.

4. The method according to claim 3, wherein the physical adjacency domain division rule comprises that each physical server is classified as one physical adjacency domain.

5. The method according to claim 1, wherein performing the data smoothing algorithm on the $C_{ij}$ to obtain the $C_{ij}'$ comprises calculating the $C_{ij}'$ using an equation $C_{ij}'=C_{ij}\times P_{ij}+C_E\times(1-P_{ij})$, wherein $P_{ij}$ is a statistical probability of the $C_{ij}$ in all $C_{ij}$ values in the network, and wherein $C_E$ is an arithmetic average value of all the $C_{ij}$ values.

6. The method according to claim 1, wherein performing the data smoothing algorithm on the $C_{ij}$ to obtain the $C_{ij}'$ comprises calculating the $C_{ij}'$ using an equation $C_{ij}'=a\times C_{ij}+C_E$, wherein a is a preset correction coefficient, wherein $a\in(0, 1)$, and wherein $C_E$ is an arithmetic average value of all $C_{ij}$ values.

7. The method according to claim 1, wherein calculating the $A_{ij}'$ comprises calculating the $A_{ij}'$ using an equation $A_{ij}'=C_{ij}'\times D_{ij}$.

8. An apparatus for adjusting a deployment location of a virtual machine, comprising:
a memory comprising instructions; and
a processor coupled to the memory, wherein the instructions cause the processor to be configured to:
determine, according to a topology structure of a network in which the virtual machine is located, and a relationship between physical servers to which any two virtual machine nodes i and j in the network belong, a communication cost between the two virtual machine nodes i and j ($C_{ij}$), wherein the $C_{ij}$ is a quantity of switches between the two virtual machine nodes i and j when the two virtual machine nodes i and j do not belong to a same physical server, wherein the $C_{ij}$ is a preset value when i and j belong to the same physical server, wherein $i\neq j$, wherein a value range of the i comprises all natural numbers not greater than N, wherein a value range of the j comprises all natural numbers not greater than N, and wherein N is a quantity of virtual machine nodes in the network;
perform a data smoothing algorithm on the $C_{ij}$ to obtain a corrected value of the $C_{ij}$ ($C_{ij}'$);
obtain a traffic statistical value between the two virtual machine nodes i and j ($D_{ij}$) in a preset historical period;
calculate a corrected adjacency degree between the two virtual machine nodes i and j ($A_{ij}'$) according to the $C_{ij}'$ and the $D_{ij}$;
perform a minimum cut algorithm on a corrected adjacency degree graph comprising the N virtual machine nodes in the network to obtain at least two sets, wherein each set comprises at least one virtual machine node, wherein different vertexes in the corrected adjacency degree graph are respectively corresponding to different virtual machine nodes, and an edge with a weight value $A_{ij}'$ exists between two vertexes corresponding to the two virtual machine nodes i and j; and
adjust deployment location of a virtual machine node in the network according to the at least two sets obtained by the minimum cut algorithm such that for any virtual machine node x, when the x and a virtual machine node (y) belong to a same set, and the x and a virtual machine node (z) belong to different sets, a communication cost between the x and the y is not greater than a communication cost between the x and the z.

9. The apparatus according to claim 8, wherein the instructions further cause the processor to be configured to perform a K-order minimum cut algorithm on the corrected adjacency degree graph comprising the N virtual machine nodes to obtain K sets, wherein K is a preset value, and wherein K is a natural number not less than 2.

10. The apparatus according to claim 8, wherein the instructions further cause the processor to be configured to:
perform clustering on the N virtual machine nodes according to a preset clustering rule to obtain at least one class cluster, wherein in a same class cluster, there is at least one other node P' for any node P such that a corrected adjacency degree between P' and P is not less than a preset threshold;
determine, according to a predefined physical adjacency domain division rule, a quantity of virtual machine nodes that can be accommodated in each physical adjacency domain (M) in the network; and
iteratively perform a 2-order minimum cut algorithm on a corrected adjacency degree graph corresponding to each class cluster to obtain a segmentation result corresponding to each class cluster, wherein each segmentation result comprises at least one set, and wherein a quantity of virtual machine nodes in each set is not greater than M.

11. The apparatus according to claim 8, wherein the instructions further cause the processor to be configured to calculate the $C_{ij}'$ using an equation $C_{ij}'=C_{ij}\times P_{ij}+C_E\times(1-P_{ij})$, wherein $P_{ij}$ is a statistical probability of the $C_{ij}$ in all $C_{ij}$ values in the network, and wherein $C_E$ is an arithmetic average value of all the $C_{ij}$ values.

12. The apparatus according to claim 8, wherein the instructions further cause the processor to be configured to calculate the $C_{ij}'$ using an equation $C_{ij}'=a\times C_{ij}+C_E$, wherein a is a preset correction coefficient, wherein $a\in(0, 1)$, and wherein $C_E$ is an arithmetic average value of all $C_{ij}$ values.

13. The apparatus according to claim 8, wherein the instructions further cause the processor to be configured to calculate the $A_{ij}'$ using an equation $A_{ij}'=C_{ij}'\times D_{ij}$.

14. A computer program product comprising a non-transitory computer readable storage medium storing program code thereon for adjusting a deployment location of a virtual machine, the program code comprising instructions for executing a method that comprises:
   determining, according to a topology structure of a network in which the virtual machine is located, and a relationship between physical servers to which any two virtual machine nodes i and j in the network belong, a communication cost between the two virtual machine nodes i and j ($C_{ij}$), wherein the $C_{ij}$ is a quantity of switches between the two virtual machine nodes i and j when the two virtual machine nodes i and j do not belong to a same physical server, wherein the $C_{ij}$ is a preset value when the two virtual machine nodes i and j belong to the same physical server, wherein $i\neq j$, wherein a value range of the i comprises all natural numbers not greater than N, wherein a value range of the j comprises all natural numbers not greater than N, and wherein N is a quantity of virtual machine nodes in the network;
   performing a data smoothing algorithm on the $C_{ij}$ to obtain a corrected value of the $C_{ij}$ ($C_{ij}'$);
   obtaining a traffic statistical value between the two virtual machine nodes i and j ($D_{ij}$) in a preset historical period;
   calculating a corrected adjacency degree between the two virtual machine nodes i and j ($A_{ij}'$) according to the $C_{ij}'$ and the $D_{ij}$;
   performing a minimum cut algorithm on a corrected adjacency degree graph comprising the N virtual machine nodes in the network to obtain at least two sets, wherein each set comprises at least one virtual machine node, wherein different vertexes in the corrected adjacency degree graph are respectively corresponding to different virtual machine nodes, and wherein an edge with a weight value $A_{ij}'$ exists between two vertexes corresponding to the two virtual machine nodes i and j; and
   adjusting deployment location of a virtual machine node in the network according to the at least two sets such that for any virtual machine node (x), when the x and a virtual machine node (y) belong to a same set, and the x and a virtual machine node (z) belong to different sets, a communication cost between the x and the y is not greater than a communication cost between the x and the z.

15. The computer program product according to claim 14, wherein performing the minimum cut algorithm on the corrected adjacency degree graph comprises performing a K-order minimum cut algorithm on the corrected adjacency degree graph comprising the N virtual machine nodes to obtain K sets, wherein K is a preset value, and wherein K is a natural number not less than 2.

16. The computer program product according to claim 14, wherein performing the minimum cut algorithm on the corrected adjacency degree graph comprises:
   performing clustering on the N virtual machine nodes according to a preset clustering rule to obtain at least one class cluster, wherein in a same class cluster, there is at least one other node P' for any node P such that a corrected adjacency degree between P' and P is not less than a preset threshold;
   determining, according to a predefined physical adjacency domain division rule, a quantity of virtual machine nodes that can be accommodated in each physical adjacency domain (M) in the network; and
   iteratively performing a 2-order minimum cut algorithm on a corrected adjacency degree graph corresponding to each class cluster to obtain a segmentation result corresponding to each class cluster, wherein each segmentation result comprises at least one set, and wherein a quantity of virtual machine nodes in each set is not greater than M.

17. The computer program product according to claim 16, wherein the physical adjacency domain division rule comprises that each physical server is classified as one physical adjacency domain.

18. The computer program product according to claim 14, wherein performing the data smoothing algorithm on the $C_{ij}$ to obtain the $C_{ij}'$ comprises calculating the $C_{ij}'$ using an equation $C_{ij}'=C_{ij}\times P_{ij}+C_E\times(1-P_{ij})$, wherein $P_{ij}$ is a statistical probability of the $C_{ij}$ in all $C_{ij}$ values in the network, and wherein $C_E$ is an arithmetic average value of all the $C_{ij}$ values.

19. The computer program product according to claim 14, wherein performing the data smoothing algorithm on the $C_{ij}$ to obtain the $C_{ij}'$ comprises calculating the $C_{ij}'$ using an equation $C_{ij}'=a\times C_{ij}+C_E$, wherein a is a preset correction coefficient, wherein $a\in(0, 1)$, and wherein $C_E$ is an arithmetic average value of all $C_{ij}$ values.

20. The computer program product according to claim 14, wherein calculating the $A_{ij}'$ comprises calculating the $A_{ij}'$ using an equation $A_{ij}'=C_{ij}'\times D_{ij}$.

* * * * *